(12) United States Patent
Daugherty, Jr.

(10) Patent No.: US 6,176,379 B1
(45) Date of Patent: Jan. 23, 2001

(54) BALL AND RACE ASSEMBLY INCLUDING A ONE PIECE RACE MEMBER INTEGRALLY FORMED WITH THE BALL

(75) Inventor: David W. Daugherty, Jr., Plainfield, IL (US)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/240,119

(22) Filed: Jan. 29, 1999

(51) Int. Cl.[7] .................................................. B61G 5/00
(52) U.S. Cl. .............................................. 213/75 R; 105/3
(58) Field of Search ....................... 105/3, 4.1; 213/75 R; 29/898.043; 384/208, 145, 146

(56) References Cited

U.S. PATENT DOCUMENTS

| | | | |
|---|---|---|---|
| 1,940,885 | * 12/1933 | Rosenberg | 29/898.043 |
| 4,005,514 | * 2/1977 | McCloskey | 29/898.043 |
| 5,219,082 | * 6/1993 | Daugherty et al. | 213/75 R |

\* cited by examiner

*Primary Examiner*—Mark T. Le
(74) *Attorney, Agent, or Firm*—James Ray & Associates

(57) ABSTRACT

A ball and race assembly having a one piece race assembly integrally formed onto the ball is provided. This ball having an integrally formed race assembly thereon has particular utility in the railway coupling industry for use in connection assemblies which are utilized in articulated coupling arrangements and slackless drawbar assemblies. The ball and race assembly comprises a ball member having a substantially spherical shape with a predetermined diameter and a one piece race member which is formed integrally with at least a portion of the ball member in a manner so as to enable rotational movement of the ball member with respect to the one piece race member. The one piece race member is a filament wound composite type material which is wound about the ball member so as to produce an outer surface which is capable of being positioned within an appropriate holding device depending upon the environment for which the ball and race assembly is to be used. In the railway industry, this outer surface of the one piece race member has a shape which is capable of being placed within an aperture of a male connection member in a railway coupling device so as to enable rotational movement of the male connection member with respect to a car connection member of the coupling device.

10 Claims, 8 Drawing Sheets

BALL AND RACE ASSEMBLY INCLUDING A ONE PIECE RACE MEMBER INTEGRALLY FORMED WITH THE BALL

FIELD OF THE INVENTION

The present invention relates, in general, to a ball and race assembly and, more particularly, this invention relates to a ball and race assembly having a one piece race assembly integrally formed onto the ball. This invention has particular utility in the railway coupling industry for use in connection assemblies which are utilized in articulated coupling arrangements and slackless drawbar assemblies.

BACKGROUND OF THE INVENTION

Articulated coupling arrangements and slackless drawbar assemblies have been well known in the railroad industry for several years as a means to connect together the adjacently disposed ends of a pair of railway freight cars in a substantially semi-permanent fashion. In other words, these railway freight cars do not require frequent separation during service. Normally they will only be separated during a required repair and/or routine maintenance being performed on one or more of them.

These railway cars are particularly adapted for what is most commonly referred to, in the railroad industry, as piggyback service and/or dedicated service wherein the cars which are joined in such semi-permanent fashion are also commonly referred to in the railway industry as either a "5-pack" or "10-pack" unit. These 5-pack or 10-pack units do not require the use of a standard coupler except between units. The primary reason such standard couplers are not required is because these units are only broken periodically. Normally, this occurs when maintenance and/or replacement of an individual component on one of the cars must be carried out.

Obviously, considerable cost-savings are achieved by this semi-permanent coupling arrangement. These cost savings are mainly derived from lower car weight, fewer railway trucks, reduced maintenance and generally lower equipment cost being achieved by elimination of draft gears and a reduction in the number of trucks required.

With the use of these semi-permanent coupling arrangements and with the higher loads presently being carried by modern railway trains, it is of the utmost importance that a close-buttoned relationship be maintained between the numerous coupler draft components. Such a close-buttoned relationship is required to reduce the effects of the impact forces which are encountered by a car under buff conditions of train operations.

One prior type of articulated coupling device used for the purpose of connecting adjacent ends of a pair of railway cars, in a semi-permanent manner, is taught in U.S. Pat. No. 5,172,819, the teachings of such patent hereby being incorporated into the present application by reference thereto.

This particular articulated coupling device includes a male connection member secured to one end of a first railway car body and a female connection member secured to an adjacent end of a second railway car body. The male connection member includes an aperture therein. A bearing assembly, including a substantially spherical member, is positioned within this aperture for joining the male connection member with the female connection member. A race assembly, formed by at least two members, is provided within the aperture and is positioned around a predetermined portion of the substantially spherical member.

The race assembly enables requisite movement of the male connection member in relation to the female connection member in each of a vertical direction and a horizontal direction over a predetermined range of angles measured from each of a centerline of the spherical member disposed in a vertical direction and a longitudinal axis of the articulated coupling arrangement disposed in a horizontal direction.

A securing means is provided which is engageable with each of the race assembly and the male connection member for securing the race assembly and the spherical member to the male connection member.

A typical slackless type drawbar assembly using a ball and race connection assembly comprises the following elements: a car connection member or female connection member engageable with a railway vehicle, a spherical member securable with the car connection member, a male connection member having a curved butt end and an aperture which is disposed around the spherical member secured within the car connection member and a two piece race assembly secured within the aperture of the male connection member and disposed between the spherical member and such aperture and a drawbar connected to such male connection member.

A disadvantage of the articulated coupling arrangements and slackness drawbar assemblies discussed above is the provision of at least two separate members to form the race assembly. Not only do these prior arrangements require careful machining of the separate pieces which form the race members to the correct size, but care must be taken to secure these two separate members within the aperture of the male connection member around a predetermined portion of the spherical member. These requirements add additional materials cost, assembling time and labor to the manufacture of the connection assembly of the articulated coupling arrangement and/or slackless drawbar assembly.

SUMMARY OF THE INVENTION

Briefly, and in accordance with one embodiment of the present invention, the ball and race assembly comprises a ball member having a substantially spherical shape with a predetermined diameter and a one piece race member which is formed integrally with at least a portion of this ball member in a manner so as to enable rotational movement of the ball member with respect to the one piece race member. Preferably the one piece race member is formed integrally with the ball member by filament winding the race material onto the ball member.

The connection assembly of the present invention comprises a substantially spherical member having a predetermined diameter and a one piece race member formed integrally with the spherical member in a manner so as to enable rotational movement of the spherical member with respect to the one piece race member. A male connection member and a car, or female, connection member for the railway coupling device is provided. The male connection member includes an aperture at one end. The race member and the spherical member are inserted within this aperture of the male connection member enabling movement of the male connection member in relation to the car or female connection member in both a vertical direction and a horizontal direction over a predetermined range of angles. A means is provided for securing the race member within the aperture. Also, a means for joining the spherical member to the female connection member is provided so as to facilitate the connection of adjacent ends of a pair of railway vehicles.

OBJECTS OF THE INVENTION

It is, therefore, one of the primary objects of the present invention to provide a ball and race assembly having a one piece race member which is integrally formed with the ball portion of such ball and race assembly.

A further object of the present invention is to provide a ball and race assembly having a one piece race member filament wound onto the ball.

Another object of the present invention is to provide a connection assembly including a ball and race assembly having a one piece race member integrally formed with the ball for use in an articulated coupling arrangement and/or a slackless drawbar assembly to connect together the adjacently disposed ends of a pair of railway type freight cars in a substantially semi-permanent fashion.

Another object of the present invention is to provide a filament wound race member which is formed integrally with a spherical member for use in a connection assembly utilized in railway coupling devices.

A further object of the present invention is to replace the two piece race assembly with an integrally formed spherical member/race member in a connection assembly utilized in railway coupling devices.

Yet another object of the present invention is to provide a connection assembly that is easily assembled thus providing a significant reduction in time and labor.

Still yet another object of the present invention is to provide a connection assembly that requires fewer component parts thereby providing a significant reduction in manufacturing cost.

Although a number of objects and advantages of the present invention have been described in some detail above, various additional objects and advantages of the connection assembly according to the present invention will become more readily apparent to those persons who are skilled in the railway coupling art from the following more detailed description of the invention, particularly, when such detailed description of the invention is taken in conjunction with both the attached drawing figures and with the appended claims.

DETAILED DESCRIPTION OF THE INVENTION

Figure 1:
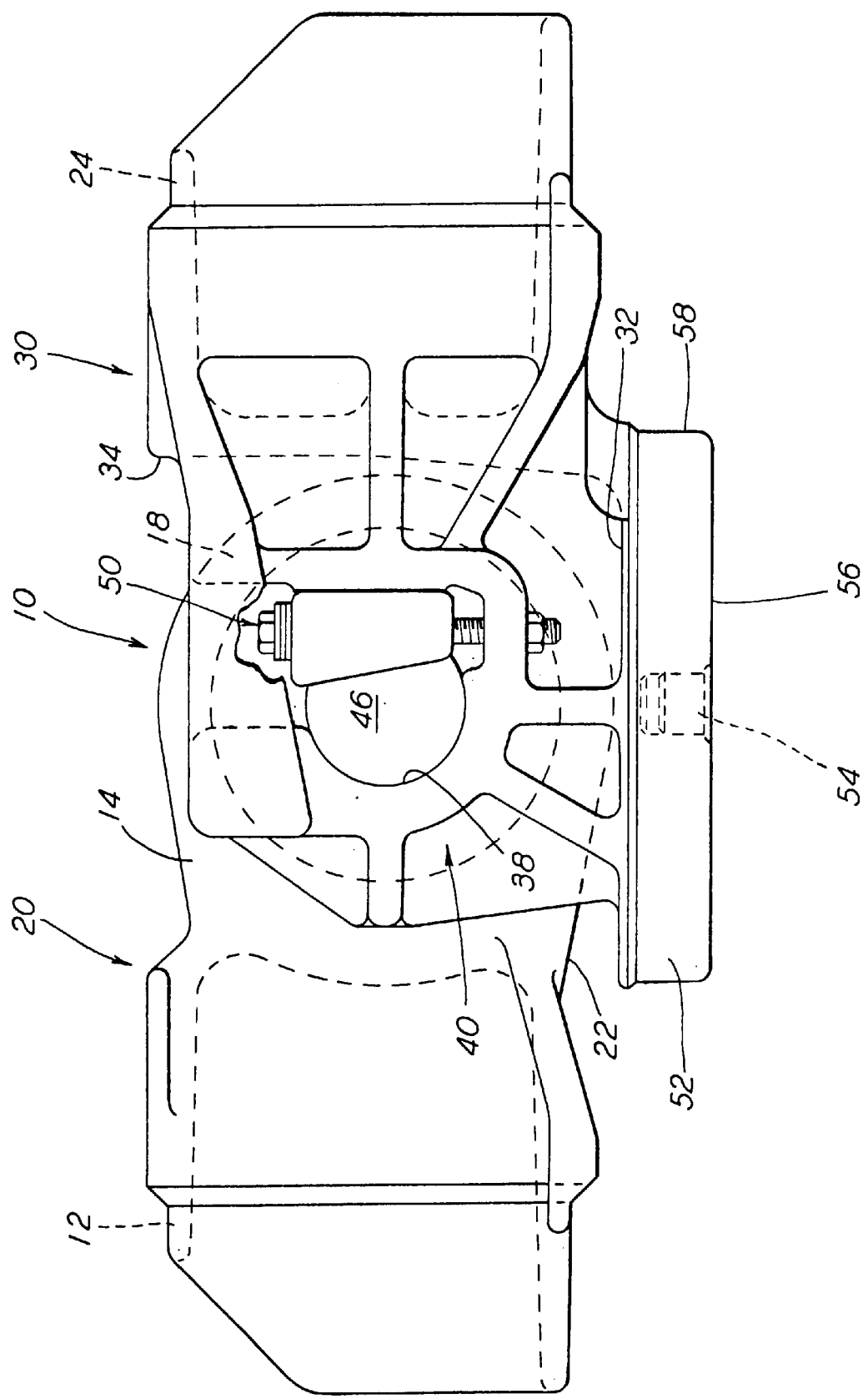
FIG. 1 is a side elevation view, partially in cross-section, which illustrates one presently preferred embodiment of a connection assembly constructed according to the present invention for use in an articulated type coupling arrangement.

Prior to proceeding to the more detailed description of the various embodiments of the instant invention, it should be pointed out that, for the sake of clarity, identical components which have identical functions have been identified with identical reference numerals throughout the several views that have been illustrated in the drawings.

Figure 2:
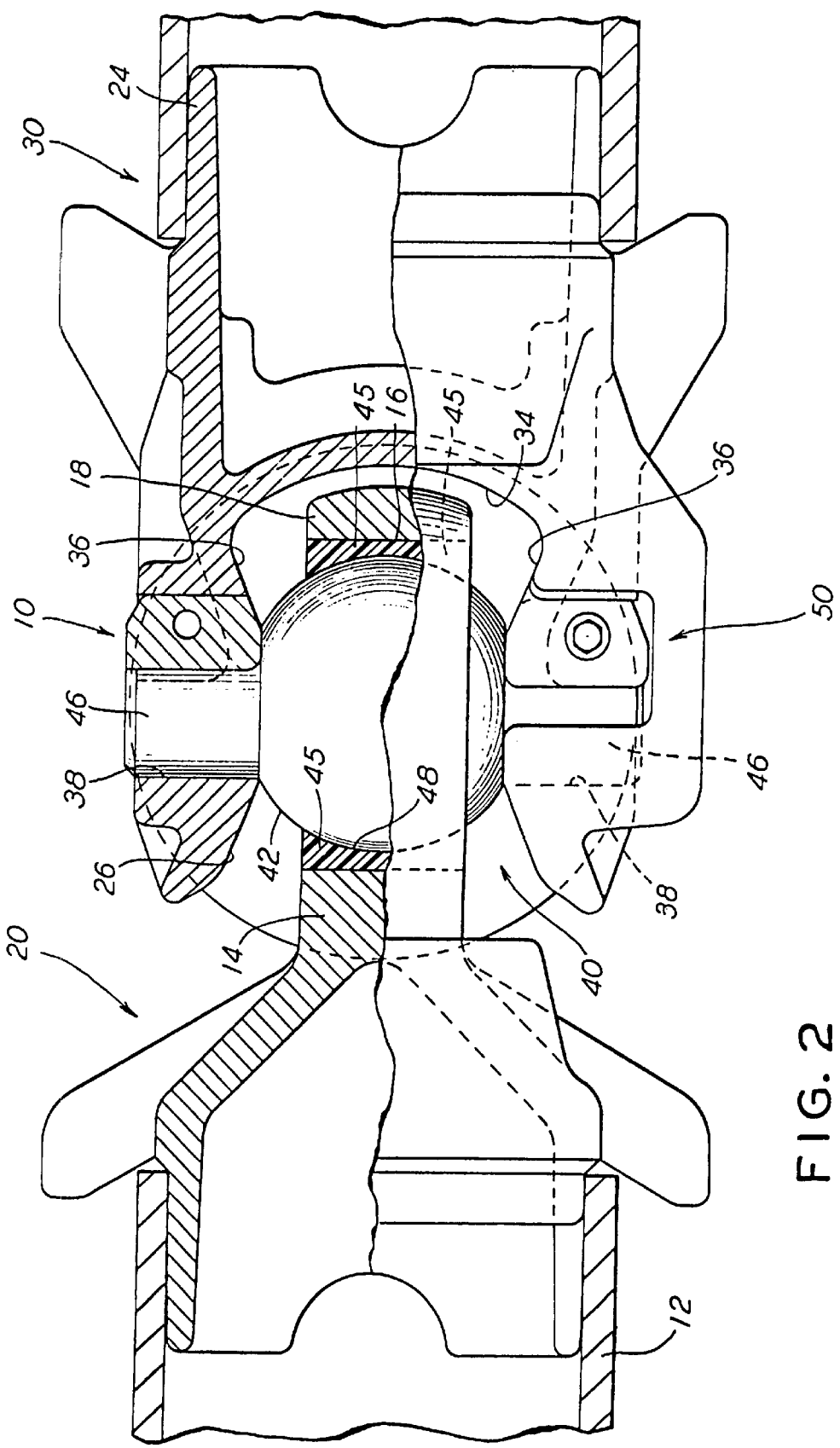
FIG. 2 is a top view, partially in cross-section, of the connection assembly illustrated in FIG. 1.

Now reference is made, more particularly, to drawing FIGS. 1–2 in which there is illustrated one presently preferred embodiment of a connection assembly for use in an articulated type coupling arrangement, generally designated 10, that is constructed in accordance with the principals of the present invention. This articulated coupling arrangement 10 can be retrofitted to existing railway cars, if desired, and is capable of connecting together, in a substantially semi-permanent manner, at least one predetermined end of a first railway car (not shown) to an adjacent predetermined end of a second railway car (not shown).

Such articulated coupling arrangement 10 generally includes a male connection member, generally designated 20, a female connection member, generally designated 30, a connection assembly, constructed according to the present invention and generally designated 40, and a means, generally designated 50, for joining the connection assembly 40 to such articulated type coupling arrangement 10 in a semi-permanent fashion.

The male connection member 20 is adapted at a first end 12 thereof in a manner that will enable such male connection member 20 to be engaged with and connected to one predetermined end of a center sill member (not shown) disposed substantially along a longitudinal centerline of one of such first railway car and such second railway car.

Prior to being secured in place, preferably by welding, the first end 12 of the male connection member 20 is positioned within the center sill portion for a predetermined distance. Usually this predetermined distance will be about 6 to 10 inches and about 8 inches being preferred and typical. Because the first end 12 of the male connection member 20 must fit within the center sill portion of the railway car, its outer dimensions are substantially controlled by the inner dimensions of such center sill portion.

The second end 14 of the male connection member 20 is generally an elongated rectangular-shaped element. The outermost end 18 of the second end 14 of the male connection member 20, preferably, has a convex shape in a plane which extends in both a vertical direction and a horizontal direction.

In addition, the bottom wall portion 22 of the second end 14 of the male connection member 20 is tapered upwardly starting from a predetermined position and extending toward such first end 12. Such tapered portion has a taper of at least about 10 degrees. The purpose of this tapered portion of the bottom wall 22 of the male connection member 20 is to allow flexing in a horizontal plane when the cars are moving over a hilly terrain.

Disposed within the second end 14 of the male connection member 20 is an aperture 16 having a predetermined size and a predetermined configuration. This aperture 16 is formed through a predetermined portion of the second end 14 of such male connection member 20 to form an inner surface 17 within this male connection member 20. The aperture 16 has a longitudinal axis that is disposed transverse to a longitudinal axis of the male connection member 20 and lies in a substantially horizontal plane.

The female connection member 30 includes a first end 24 which is configured in a manner that will enable such female connection member 30 to be engaged with and connected to an adjacent predetermined end of a center sill member (not shown) disposed substantially along a longitudinal centerline of an opposite one of such first railway car and such second railway car (not shown).

A cavity 26 is formed in a second end of the female connection member 30. This cavity 26 receives therein at least a portion of each of the second end 14 of the male connection member 20 and such aperture 16 formed through the predetermined portion of such second end 14 of the male connection member 20. This cavity 26 is formed by a substantially horizontally-disposed bottom wall portion 32, a substantially vertically-disposed back wall portion 34 connected along a bottom edge thereof to a rear edge of such bottom wall portion 32 and a pair of vertically-disposed side wall portions 36 connected along a bottom edge thereof to the bottom wall portion 32 and along a rear edge thereof to such back wall portion 34.

A vertically-disposed plane which intersects a geometric centerline of each respective one of such pair of side wall portions 36 being substantially parallel to each other. An inner surface of each of such bottom wall portion 32 and such rear wall portion 34 and such pair of side wall portions 36 define a predetermined size and a predetermined shape of the cavity 26 which is open adjacent a top and front surface thereof. An opening 38 is formed through a predetermined portion of each one of the pair of side wall portions 36.

The articulated coupling arrangement 10 includes a connection assembly 40. Such connection assembly 40 includes a substantially spherical member 42. The one piece race member 45 is formed integrally with spherical member 42 and encircles at least a portion of the spherical member 42. The spherical member 42 forms a part of a mold upon which the race member 45 is molded. The outer surface 47 of the race member 45 has a configuration which allows the spherical member 42 having the race member thereon to be fitted within the aperture 16. In a preferred embodiment, the outer surface 47 of the one piece race member 45 will abut the inner surface 17 of the aperture 16 formed in the male connection member 20.

Any well known technique and/or material may be used to integrally form the one piece race member with the spherical member as long as the resultant connection assembly has sufficient strength to withstand the forces generated by in-track service and the rotation of the spherical member against the race member.

Figure 8:
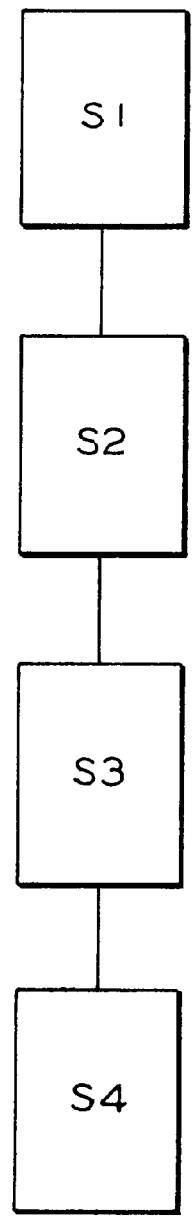
FIG. 8 is a method of forming the race member of the present invention.

In a preferred embodiment, the one piece race member 45 can be formed of a polymeric and/or composite material and integrally formed onto the spherical member by a filament winding process. For example as shown in FIG. 8 the one piece race member 45 can be formed by (S1) placing a Teflon®/Dacron® yarn mesh base about the spherical member 42 and (S2) filament winding a resin impregnated reinforcing material, such as epoxy impregnated glass about the base, (S3) curing the resin in the fibers, and (S4) machining the race member 45 to the desired size.

Teflon®, also known as PTFE and/or polytetrafluoroethylene, and Dacron®, also known as polyester, are registered trademarks of E.I. Dupont De Nemours. The Dacron® yarns enable the resin impregnated fibers to bond to the desired shape while the Teflon® yarns provide a nonstick surface which will provide sufficient lubrication between the outer surface of the spherical member 42 and the inner surface 49 of the one piece race member 45. This type of material has especially good strength and lubricating abilities which allows for unrestricted movement of the spherical member thereagainst.

Other polymeric materials, well known in the art, may be used to form the one piece race member 45 as long as such materials provide sufficient strength and lubrication to such one piece race member 45.

A release agent may be provided on the surface of the spherical member 42, if desired, to prevent adherence of the one piece race member 45 to the surface of the spherical member 42. Also, a lubricating liner or material may be provided on the surface of the spherical member 42 prior to placement of the one piece race member 45 thereon. Any well known release agents and lubricating liner/material may be used.

Figure 4:
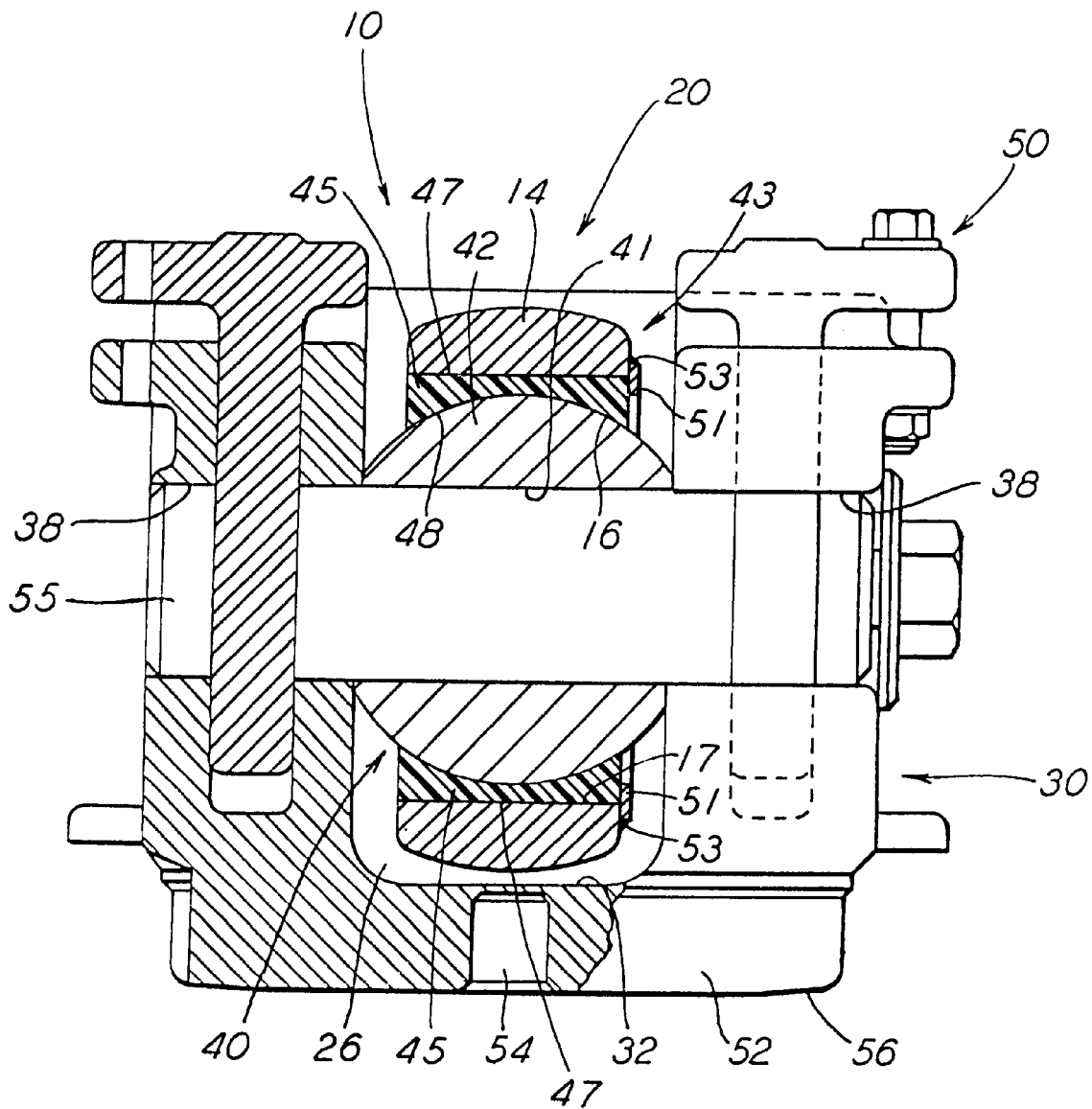
FIG. 4 is a cross-sectional view of the bearing assembly illustrated in FIG. 3.
Figure 7:
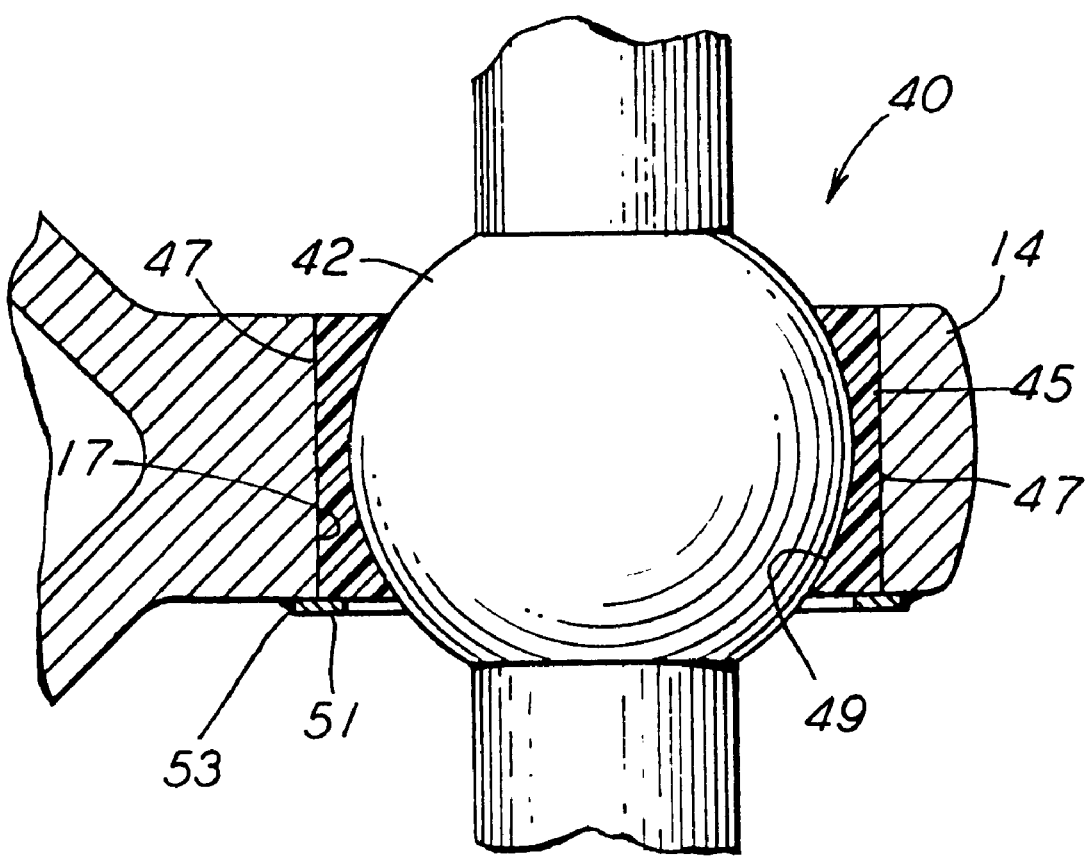
FIG. 7 is a partial view of the connection assembly of the present invention which may be utilized in either an articulated type coupling arrangement or a slackless type drawbar assembly.

There is a securing means 43 provided for securing the one piece race member 45 within the aperture 16 of the male connection member 20. This securing means 43 can be a mechanical securing means as illustrated in FIGS. 4 and 7, such as in the form of a circular ring 51 which is secured, such as by welding, along the interface surface area 53.

Depending upon the environment for which the race is being used, an adhesive material, brazing material, or any type of well known securing material may be used to secure the one piece race member in place. For example, in the railroad industry, a securing material must be used which can sufficiently withstand the forces exerted on the coupling device during use in the railway vehicle so as to ascertain that the one piece race member 45 remains secured within the aperture 16 of the male connection member 20. This securing material may be inserted between the outer surface 47 of the one piece race member 45 and the inner surface 17 of the aperture 16 of the male connection member 20. An additional option, depending upon the material used to form the one piece race member 45, would be for this one piece race member 45 to be welded or fused within the aperture 16 of the male connection member 20.

In some applications for a ball and race assembly, it may be desirable as an alternative technique for securing a thermoset resin impregnated polymeric and/or composite type one piece race member 45 within an aperture would be to partially cure the thermoset resin in the race member 45 during production. Then, during assembly of the spherical member 42, having the one piece race member 45 integrally formed thereon, within a connection assembly, fully curing the resin such that this resin bonds the one piece race member 45 within the aperture.

A pair of shaft members 46 extend outwardly a predetermined length from axially-opposed surfaces of such spherical member 42. One of such pair of shaft members 46 being engaged in a respective one of such openings 38 formed through such each one of such pair of side wall portions 36 of such cavity 26 formed in the second end of such female connection member 30. At least a portion of each of such pair of shaft members 46 having a substantially identical configuration as at least a portion of such predetermined configuration of such opening 38 formed through such side wall portions 36.

A joining means, generally designated 50, is engageable with at least one of such pair of shaft members 46 and a portion of such opening 38 formed through such side wall portions 36 for securing the connection assembly 40 to such female connection member 30 and thereby securing the male connection member 20 to such female connection member 30 to form the articulated type coupling arrangement 10 of the instant invention.

According to the present invention, the bottom wall portion 32 of the cavity 26 formed in the second end of the female connection member 30 further includes a center plate member 52 which matingly engages a center bowl (not shown) of a bolster portion. (not shown) of a railway car truck (not shown). Such center plate member 52 includes a vertically disposed hole 54 adjacent a bottom surface 56 thereof. Such hole 54 is located substantially in the center of the center plate member 52.

Additionally, the articulated coupling arrangement 10 further includes a vertically disposed pin member (not shown) which is engageable in the hole 54 in the center plate member 52 and a vertically disposed hole (not shown) in the center bowl of the bolster.

It is presently preferred that the bottom surface 56 of the center plate member 52, which is a bearing surface, be hardened to at least about 375 Brinell for a depth of at least about one-eighth inch.

Further, the center plate member 52 is substantially round, is and a vertically disposed side 58 thereof is hardened to a Brinell hardness of at least about 300 for a distance of at least about one inch up from the bottom surface 56 and to a depth of about one-eighth inch.

In the presently preferred embodiment of this invention, the second end 14 of the male connection member 20 has a predetermined configuration adjacent an outermost end 18 thereof. This predetermined configuration of the outermost end 18 of the second end 14 of the male connection member 20 is a substantially convex shape in each of a vertically disposed plane and a horizontally disposed plane.

In addition, it is preferred that the vertically disposed back wall portion 34 of the cavity 26 formed in the second end ol the female connection member 30 has a predetermined configuration. This predetermined configuration of the vertically disposed back wall portion 34 of the cavity 26 is a substantially concave shape in at least one of a vertical plane and a horizontal plane.

It is also preferred that the spherical member 42 and the pair of shaft members 46, forming a portion of the connection member 40 of the articulated coupling arrangement 10, be formed as a single piece.

In the preferred embodiment of this invention, the pair of vertically disposed side wall portions 36 include a tapered portion is adjacent the front surface of the cavity 26 and adjacent the vertically disposed back wall portion 34 of the cavity 26 to enable the second end 14 of the male connection member 20 to rotate about the spherical member 42 in a horizontal direction.

Finally, the presently preferred predetermined configuration of the opening 38 formed through each pair of such vertically disposed side wall portions 36 includes a generally round portion engageable with a portion of a respective one of such pair of shaft members 46.

Figure 3:
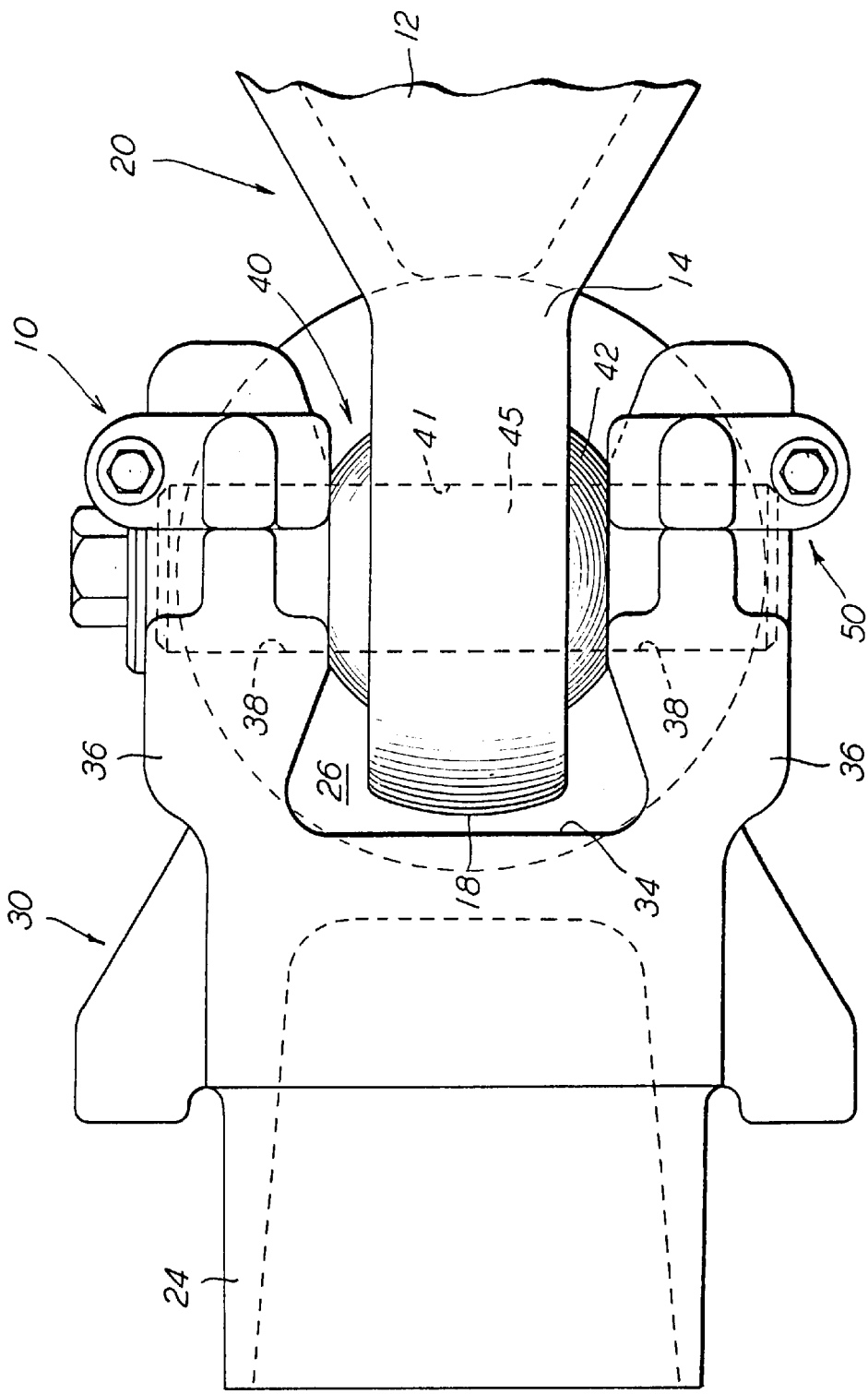
FIG. 3 is a top view which illustrates an alternative embodiment of a connection assembly for use in an articulated type coupling arrangement.

In the alternative embodiment of the connection assembly 40 illustrated in FIGS. 3 and 4, the connection assembly 40 includes a substantially spherical member 42. At least a predetermined portion of such spherical member 42 is positioned within such aperture 16 formed through the predetermined portion of the second end 14 of the male connection member 20. The spherical member 42 has a predetermined diameter.

A bore 41 is formed through the spherical member 42. Such bore 41 has each of a predetermined size and a predetermined shape. A longitudinal axis of such bore 41 lies in a substantially horizontal plane.

A pin member 55, which has a horizontally disposed axis, is provided. The pin member 55 extends through the bore 41 in the spherical member 42 for a predetermined length on each side of axially opposed surfaces of the spherical member 42. A portion of the pin member 55 is disposed within the bore 41 of the spherical member 42 and has a substantially identical size and a substantially identical shape as the predetermined size and predetermined shape of the bore 41 thereby enabling a press-fit. At least a portion of the predetermined length on each side of the spherical member 42, which engages at least a portion of the opening 38 formed through the pair of side wall portions 36, has a substantially identical size and identical configuration as the predetermined configuration of the opening 38.

While a number of embodiments of the connection assembly for use in an articulated type coupling arrangement, constructed according to the present invention, have been described in detail above, it should be obvious to persons skilled in the railway coupling art that the connection assembly of the present invention can be effectively used in slackless type drawbar assemblies as well.

Figure 5:
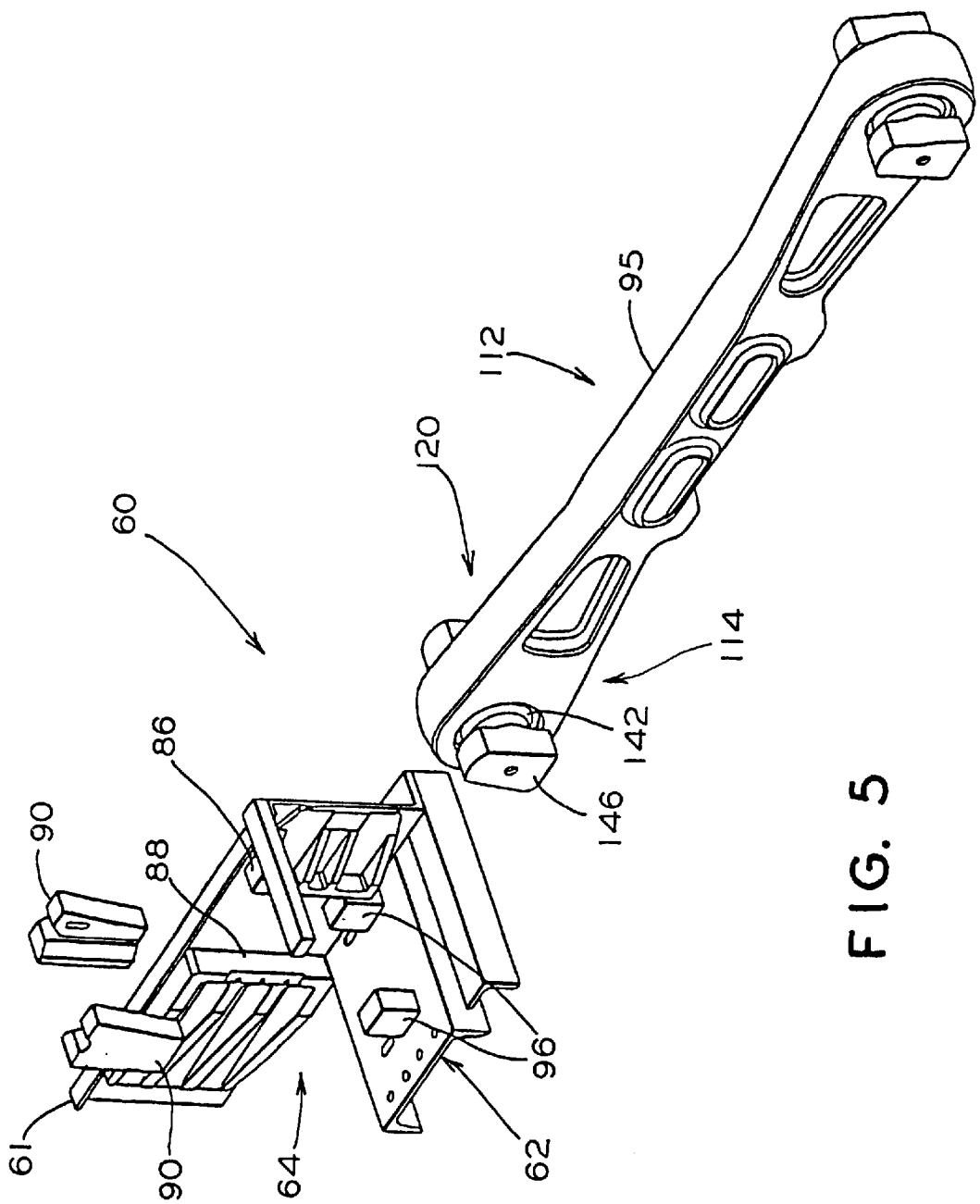
FIG. 5 is an expanded view of a slackless type drawbar assembly using the connection assembly of the present invention prior to insertion of the male connection member of the drawbar assembly into the female connection member.
Figure 6:
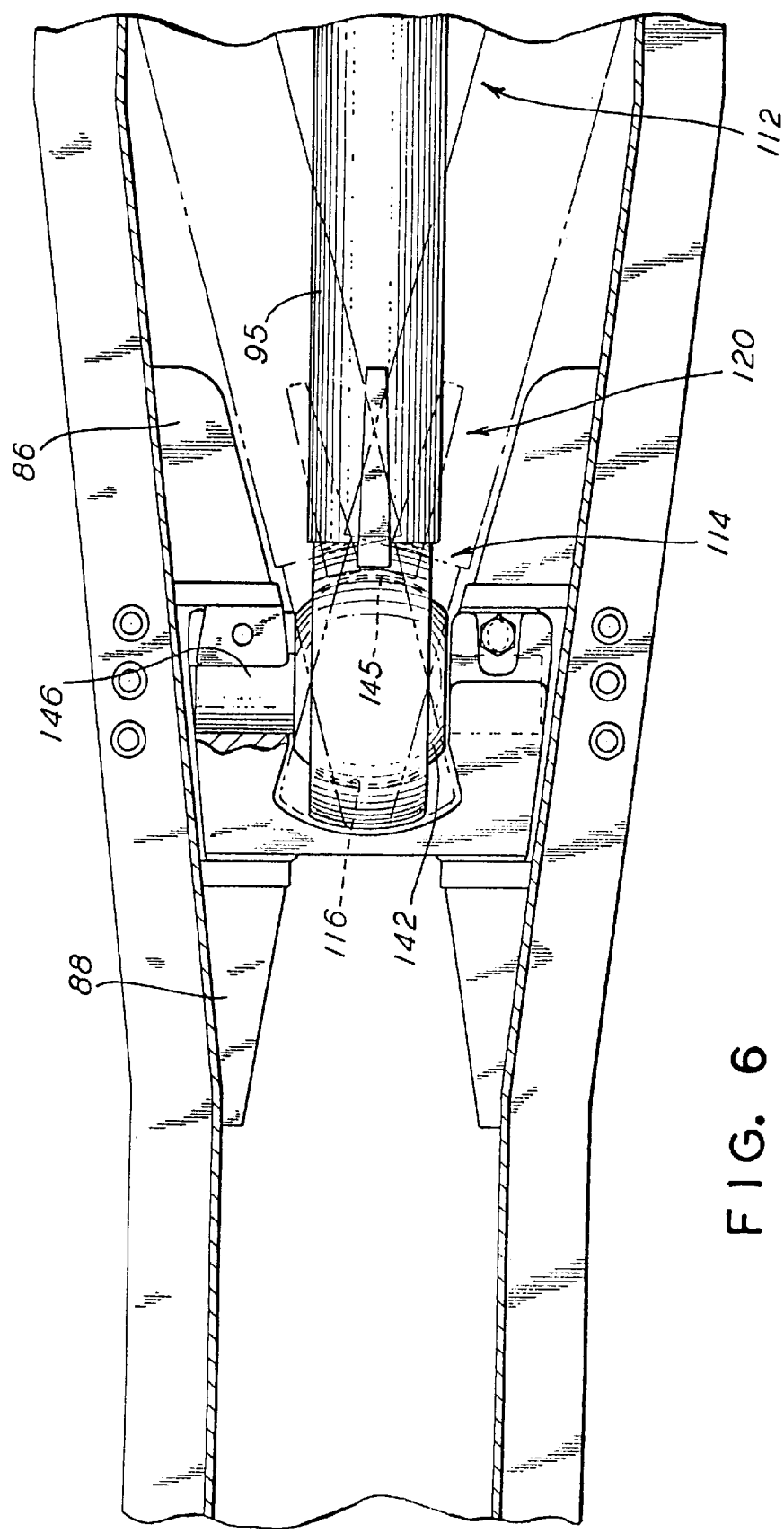
FIG. 6 is a top view of the connection assembly of a slackless type drawbar assembly wherein the male connection member of the drawbar assembly has been joined with the female connection member.

Reference is now made, more particularly, to FIGS. 5–6. Illustrated therein are the essential components of a slackless type drawbar assembly, generally designated 60, used to connect together in a substantially semi-permanent fashion adjacently disposed ends of a pair of railway cars (not shown).

This slackless drawbar assembly 60 includes a car connection member or female connection member, generally designated 64, which is engageable via a carrier plate 62 in one end of a center sill member 61. The carrier plate 62 can be secured with such center sill member 61 by any well known means, such as, for example with a bolt and lock nut assembly. The center sill member 61 is secured to a bottom portion of a car body member (not shown) of a railway car (not shown).

The car connection member 64, generally includes a pair of front and a pair of rear draft stops 86 and 88, respectively, locking wedges 90, a pair of shaft members 146 and shaft member supports 96. The locking wedges 90 may be separate members or may be a single machined or cast piece wherein the locking wedges are connected by a bridge member (not shown)

Filler blocks (not shown) may be included between the rear draft stops 88 and the locking wedges 90 to retrofit some of the longer, older drawbar systems to systems capable of using the connection assembly of the present invention. A spherical shaped member 142 is secured to the shaft members 146 by any well known means. These shaft members 146 are securable with the car connection member 64 through the shaft member supports 96.

A male connection member, generally designated 120, having a first end, generally designated 112 and a second end, generally designated 114, is provided. An aperture 116, having a predetermined size and a predetermined shape, is formed through a predetermined portion of the second end 114 of the male connection member 120 to form a substantially cylindrical inner surface 115 within the male connection member. This aperture 116 has a longitudinal axis that is disposed transverse to a longitudinal axis of the male connection member 120 and lies in a substantially horizontal plane.

The male connection member 120 includes a means 95 attached thereto for connecting together an end of a second railway car (not shown) with an adjacently disposed end of the first railway car (not shown). This means 95 can be in the form of a drawbar assembly including a second male connection member, similar to that described above, which is capable of being fitted with a corresponding car connection member or female connection member, also similar to that described above, on the second railway car or a rotary type connection assembly (not shown).

The slackless type drawbar assembly 60 includes a connection assembly 140, which is similar to the articulated type coupling arrangement 10, as shown in FIGS. 1–4, and discussed in detail above. Such connection assembly 140 includes a substantially spherical member 142. At least a predetermined portion of such spherical member 142 is positioned within such aperture 116 formed through the predetermined portion of the second end 114 of the male connection member 120. Such spherical member 142 has a predetermined diameter.

A one piece race member 145 is formed integrally with the spherical member 142 by any well known technique, as discussed in detail above. Such one piece race member 145 which is positioned about at least a portion of the spherical member 142 is inserted within the aperture 116 of the male connection member 120 and secured therein by any well known and/or previously mentioned means as discussed in detail above.

While a number of embodiments of the connection assembly for use in an articulated type coupling arrangement and/or a slackless drawbar type assembly, constructed according to the present invention, have been described in detail above, it should be obvious to persons skilled in the railway coupling art that various other modifications and adaptions of such articulated coupling arrangement can be made without departing form the spirit of the invention and scope of the appended claims.

I claim:

1. A connection assembly for use in one of an articulated coupling arrangement and a slackless drawbar assembly utilized in connecting together, in a substantially semi-permanent manner, ajacently disposed ends of a pair of railway cars, said one of an articulated coupling arrangement and a slackless drawbar assembly including at least one male connection member and at least one female connection member, said connection assembly comprising:

(a) a male connection member having an end, said end having an aperture of a predetermined configuration formed therein;

(b) a substantially spherical member having a predetermined diameter, said spherical member form in a part of a mold for molding a race member;

(c) a one piece race member formed integrally on said part of the mold of said spherical member in a manner so as to enable rotational movement of said spherical member with respect to said one piece race member, said race member and said spherical member capable of being inserted within said aperture of said male connection member enabling movement of such male connection member in relation to such female connection member in both a vertical direction and a horizontal direction over a predetermined range of angles;

(d) means for securing said race member within said aperture; and (e) means for joining said spherical member to such female connection member so as to facilitate a connection of adjacent ends of such pair of railway vehicles.

2. A connection assembly, as recited in claim 1, wherein said one piece race member comprises a filament wound composite material.

3. A connection assembly, as recited in claim 2, wherein said one piece race member is formed by filament winding thermoset resin impregnated fibers about a polymeric or composite base and curing said resin impregnated fibers.

4. A ball and race assembly, as recited in claim 3, wherein said polymeric or composite base is a polytetrafluoroethylene/polyester base.

5. A connection assembly, as recited in claim 2, wherein said one piece race member is formed by filament winding thermoset resin impregnated fibers about a polymeric or composite base and partially curing said resin impregnated fibers.

6. A connection assembly, as recited in claim 5, wherein at least a portion of said means for securing said one piece race member within said aperture includes fully curing said one piece race member after insertion into said aperture of said male connection member.

7. A connection assembly, as recited in claim 1, wherein said means for securing said one piece race member within said aperture includes a circular ring for mechanically securing said one piece race member within said aperture of said male connection member.

8. A connection assembly, as recited in claim 1, wherein an outer surface of said one piece race member has a substantially identical size and shape as a surface of said aperture formed in said male connection member.

9. A connection assembly, as recited in claim 1, wherein said connection assembly is adapted to accommodate a release means positioned between said ball member and said one piece race member.

10. A connection assembly, as recited in claim 1, wherein said connection assembly is adapted to accommodate one of a lubricating liner and lubricating material positioned between said ball member and said one piece race member.

* * * * *